UNITED STATES PATENT OFFICE.

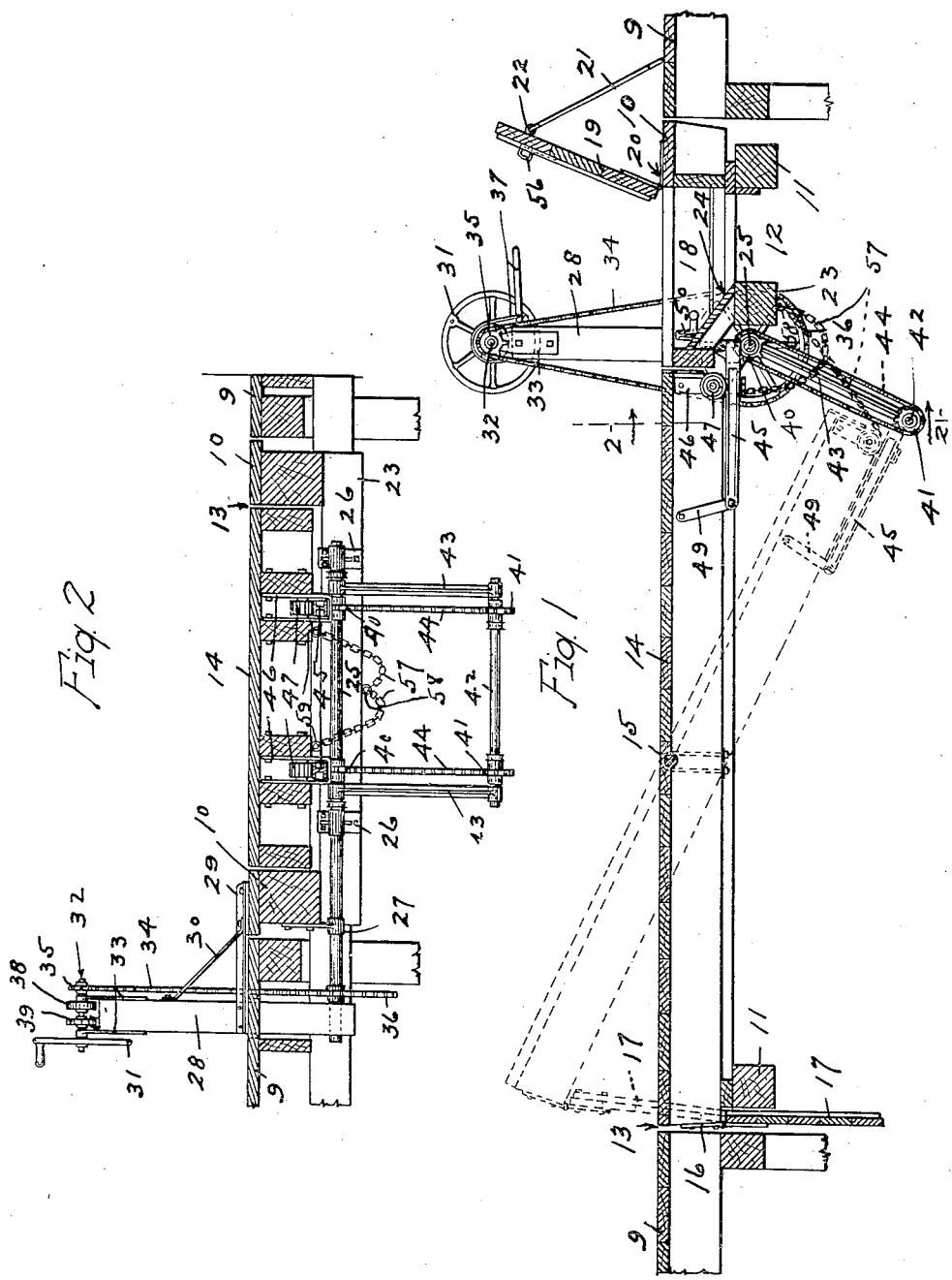

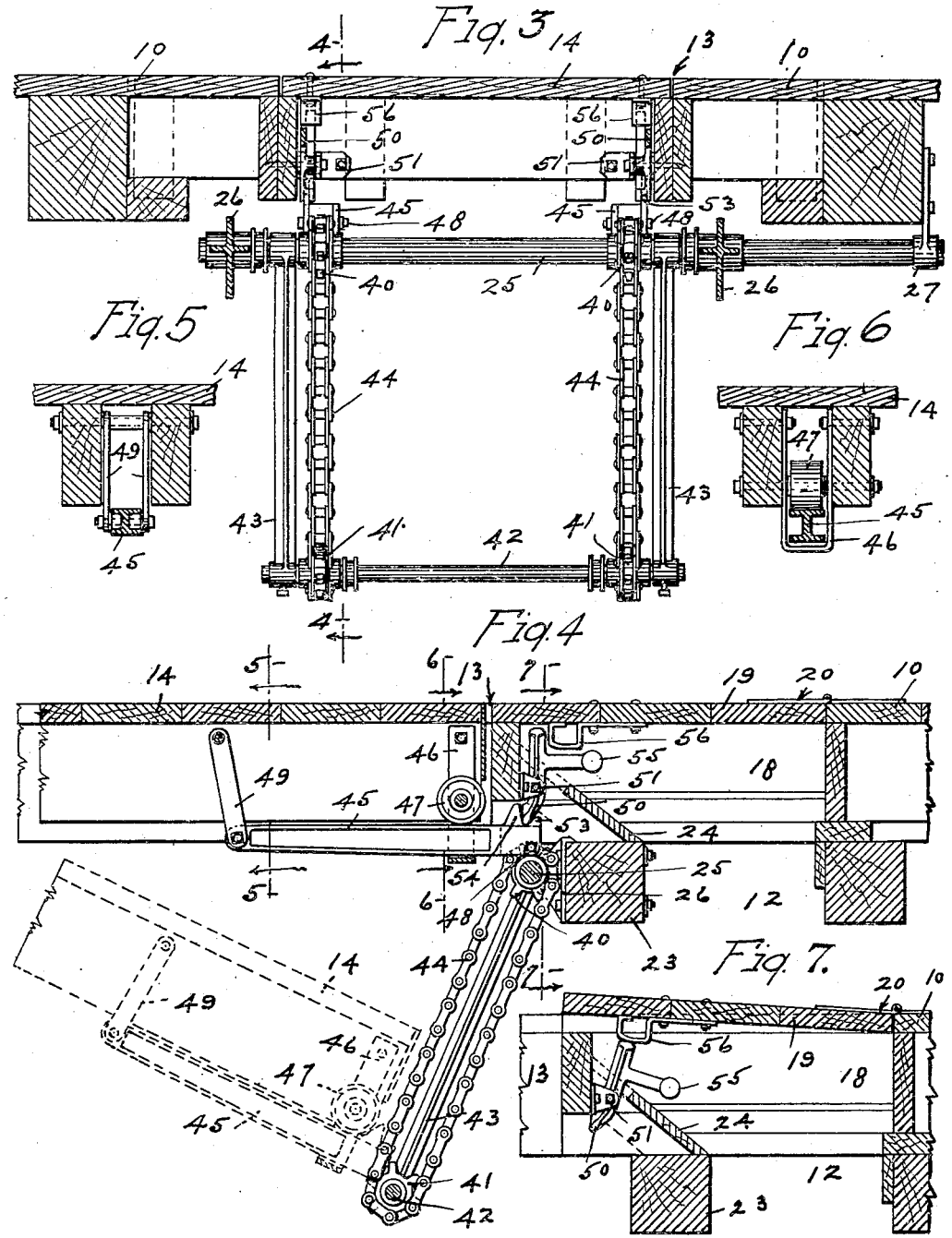

FRED W. COOLEY, OF MINNEAPOLIS, MINNESOTA.

DUMPING-PLATFORM.

1,250,974.  Specification of Letters Patent. Patented Dec. 25, 1917.

Application filed March 12, 1917. Serial No. 154,149.

*To all whom it may concern:*

Be it known that I, FRED W. COOLEY, a citizen of the United States, residing at Minneapolis, in the county of Hennepin and State of Minnesota, have invented certain new and useful Improvements in Dumping-Platforms; and I do hereby declare the following to be a full, clear, and exact description of the invention, such as will enable others skilled in the art to which it appertains to make and use the same.

My invention relates to dumping platforms intended for general use, but more especially intended for use as wagon dumps for use in connection with country elevators, and wherein such wagon dumps are usually incorporated within the platforms of weighing scales located in driveways, so that wagons loaded with grain may be driven thereon, weighed and thereafter dumped by tilting the wagon dumps sufficiently to cause the grain to flow from the wagon boxes, through trap door-equipped openings in the scale platforms and into pits located thereunder and in which pits are mounted elevator boots and legs.

To the above end, generally stated, the invention consists of the novel devices and combinations of devices hereinafter described and defined in the claims.

In the accompanying drawings, which illustrate the invention, like characters indicate like parts throughout the several views.

Referring to the drawings,

Figure 1 is a view of the invention in fragmentary longitudinal vertical section, with some parts shown in different positions by means of broken lines;

Fig. 2 is a transverse section taken on the line 2—2 of Fig. 1;

Fig. 3 is a view of certain parts, as shown in Fig. 2, but on an enlarged scale;

Fig. 4 is a longitudinal vertical section taken on the line 4—4 of Fig. 3, with some parts shown in different positions by means of broken lines;

Fig. 5 is a detail view in section taken on the line 5—5 of Fig. 4;

Fig. 6 is a detail view in section taken on the line 6—6 of Fig. 4; and

Fig. 7 is a detail view in section taken on the line 7—7 of Fig. 4.

The numeral 9 indicates a driveway having located therein a weighing scale platform mounted on carrying timbers 11. Located under the scale platform 10, is a pit 12 in which is mounted an elevator boot and leg, not shown. Formed within the scale platform 10, is a rectangular opening 13 in which is mounted a dumping platform 14, commonly called a "wagon dump". This dumping platform 14 is intermediately mounted for tilting movement on a horizontal transverse shaft 15, the ends of which are secured to the scale platform 10. Suspended from the front end of the dumping platform 14, by hinges 16, is the customary guard 17, which, when said platform is tilted, closes the opening into the pit.

Formed in the scale platform 10, at the rear of the dumping platform 14, is an opening 18 into the pit 12 which is normally closed by a trap door 19 connected by hinges 20 to the scale platform 10 for opening movement away from the dumping platform 14. A long rod 21, connected to the trap door 19 by an eye-bolt 22, is provided for opening and closing said door and for supporting the same in an open position, as shown in Fig. 1. Extending transversely under the opening 18, is a timber 23 covered by an apron 24, which extends to the front of the opening 18 and directs the grain into the pit 12.

Extending transversely under the scale platform 10, is a horizontal main shaft 25 journaled in bearings 26 secured to the timber 23, which is carried by the scale platform 10, and in a bearing 27, which is secured to one of the main longitudinal timbers of said platform. An upright post 28 is supported from and at one side of the scale platform 10 by angle irons 29 and is suitably braced therefrom by braces 30. The lower end of the post 28 is extended below the surface of the driveway 9 and is supported, in part, by the adjacent end of the main shaft 25. The main shaft 25 is rotated in either direction by a crank wheel 31 on a short shaft 32 journaled in bearings 33 secured to the upper end of the post 28. A sprocket chain 34 runs over a small sprocket wheel 35 on the shaft 32 and a large sprocket wheel 36 on the main shaft 25. The speed at which the shaft 32 rotates may be governed by a hand piece-equipped brake band 37 and coöperating wheel 38 on said shaft. The shaft 32 may be locked, at will, against rotation in one direction, as will presently appear, by a coöperating ratchet wheel and dog 39.

A pair of sprocket wheels 40 are secured for rotation with the main shaft 25 and are alined with sprocket wheels 41 loosely journaled on a rod 42, which extends parallel to the shaft 25 and forms the transverse member of a U-shaped frame, the arms 43 of which are pivoted at their upper ends to said shaft. Heavy sprocket chains 44 are arranged to run over the alined pairs of sprocket wheels 40 and 41. Each sprocket chain 44 is connected to the adjacent end of the tilting platform 14 by a combined lifting and supporting bar 45. These bars 45 are mounted in U-shaped guide brackets 46 for horizontal endwise sliding movement longitudinally of the tilting or dumping platform 14. Journaled in the guide brackets 46, are anti-friction rollers 47 on and under which the intermediate portions of the bars 45 travel. The outer ends of the bars 45 are bifurcated and the prongs thereof embrace the respective sprocket chain 44 and are pivotally connected thereto by pivot bolts 48. Pairs of depending links 49 support the inner ends of the bars 45 from the timbers of the tilting platform 14 with freedom to partake of their endwise movements.

When the tilting platform 14 is in normal position, the prongs of the bifurcated ends of the bars 45 rest directly upon the hubs of the sprocket wheels 40 as supports and thereby afford positive means for holding the platform 14 against tilting movement and support the adjacent end thereof. The initial movement, imparted to the sprocket chains 44 by operating the crank wheel 31, to tilt the platform 14, will move the bars 45 endwise out of engagement with their fixed supports, to wit: the hubs of the sprocket wheels 40. In place of using the hubs of the sprocket wheels 40 as supports for the bars 45, the shaft 25, or any other suitable support, may be used. A further movement of the sprocket chain 44 in the same direction will impart the necessary movement to carry the platform 14 into a position, as shown in Figs. 1 and 4. A reverse movement in the chains 44 will return the tilting platform 14 to normal position and, at the limit of this movement, endwise movement is imparted to the bars 45 by the chains 44 to again carry the same onto the hubs of the sprockets 40.

To secure the bars 45 against endwise movement and thereby prevent tilting movement of the platform 14, I provide for coöperation with each of said bars a vertically disposed latch lever 50, intermediately pivoted in a bearing 51 secured to one of the transverse timbers of the scale platform 10. The lower or short ends of the latch levers 50, when in operative positions, extend between pairs of longitudinally spaced cam lugs 52 and 53 formed on certain of the prongs of the bifurcated ends of the bars 45. It will be noted that the cam lugs 54 are located inward from the cam lugs 53 and that they are considerably higher than said cam lugs 53, in order that, during the projecting movement of the bars, the same engage and move the latch levers 50 into operative positions. On the upper or long end of each lever 50, is a weight 55 which places said levers under yielding strain to open.

To hold the latch levers 50 in operative positions, there are secured to the under side of the trap door 19 lock lugs 56, which extend in the paths of movement of said levers from operative to inoperative positions. Obviously, while the trap door 19 is closed, the latch levers 50 are positively held in operative positions, and hence, the bars 45, which hold the platform 14 against tilting movement. To tilt the platform 14, it is first necessary to open the trap door 19 to release the latch levers 50 and permit the same to be moved into inoperative positions by their weights 55, during the retracting movement of the bars 45. In case the latch levers 50 should stick, during their movement into inoperative positions, the cam lugs 53, under the retracting movement of the bars 45, will positively operate the same.

When the latch levers 50 are in inoperative position, it is impossible to completely close the trap door 19, for the reason that the lock lug 56 thereon will engage the upper ends of said latch levers as stops. It will thus be seen that if the trap door 19 is only partly closed, the operator will know that the tilting platform is not locked against tilting movement. To limit the tilting movement of the platform 14, positive stops are provided therefor. As shown, these stops are formed by attaching one of the ends of a pair of chains 57 to the timber 23 by a common eye-bolt 58, and attaching the other ends of said chains by eye-bolts 59, one to each of the adjacent ends of the central longitudinal timbers of the platform 14. Obviously, these stop chains 57 will relieve all of the strain on the tilting mechanism of the platform, at the time the same reaches and is held in its lowermost position.

From the above description, it is evident that the tilting platform 14, when in normal position, is supported at its front end by the carrying finger 11, at its intermediate portion, by the shaft 15 and, at its rear end, by the bars 45. It will thus be seen that the tilting platform 14 is securely held in normal position. In case the tilting platform 14 should bend under a load thereon, the bars 45, when moved into contact with the hubs of the wheels 40, will positively bring said platform back into its original position.

What I claim is:—

1. The combination with a tilting platform and a trap door, of operating connections for tilting said platform, a latch for securing said connections in a position to hold the platform against tilting movement, and a part on the trap door arranged, when the door is closed, to hold the latch in an operative position.

2. The combination with a tilting platform and a trap door, of operating connections for tilting said platform, a latch for securing said connections in a position to hold said platform against tilting movement, and a lock lug on the trap door arranged, when said door is closed, to hold the latch in an operative position.

3. The combination with a tilting platform and a trap door, of operating connections for tilting said platform, a latch for securing said connections in a position to hold said platform against tilting movement, and a lock lug on the trap door arranged, when said door is closed, to hold the latch in an operative position, said latch arranged to prevent the closing movement of the trap door, except when said latch is in an operative position.

4. The combination with a tilting platform and a trap door, of operating connections for tilting said platform including a movable bar adapted, when in one of its positions, to hold said platform against tilting movement, a latch for holding said bar in the position in which it secures said platform against tilting movement, and a lock lug on the trap door arranged, when said door is closed, to hold the latch in an operative position.

5. The combination with a tilting platform and a trap door, of operating connections for tilting said platform including a movable bar adapted, when in one of its positions, to hold said platform against tilting movement, a latch for holding said bar in the position in which it secures said platform against tilting movement, and a lock lug on the trap door arranged, when said door is closed, to hold the latch in an operative position, said latch arranged to prevent the closing movement of the trap door, except when said latch is in an operative position.

6. The combination with a tilting platform and a trap door, of operating connections for tilting said platform including a movable bar adapted, when in one of its positions, to hold said platform against tilting movement, a latch for holding said bar in the position in which it secures said platform against tilting movement, said latch being under yielding strain tending to move the same into an inoperative position, a cam lug on said bar arranged to engage the latch, during the movement of said bar in one direction, and carry the same into an operative position, and a lock lug on the trap door arranged, when said door is closed, to hold the latch in an operative position.

7. The combination with a tilting platform, of operating connections for tilting said platform including a bar mounted for endwise movement on said platform, and a relatively fixed support with which said bar engages, in one position of the operating connections, to hold said platform against tilting movement.

8. The combination with a tilting platform, of a main shaft and operating connections therefor, a depending and horizontally swinging frame carried by said shaft, a pair of alined chain wheels, the one secured for rotation with the main shaft and the other journaled on said frame, a chain arranged to run over said wheels, a lifting bar secured to said chain and mounted on the tilting platform for endwise movement, and a support onto which the lifting bar is moved by said chain in one of its positions to hold said platform against tilting movement.

9. The combination with a tilting platform, of a main shaft and operating connections therefor, a depending and horizontally swinging frame carried by said shaft, a pair of alined chain wheels, the one secured for rotation with the main shaft and the other journaled on said frame, a chain arranged to run over said wheels, a lifting bar secured to said chain and mounted on the tilting platform for endwise movement, a support onto which the lifting bar is moved by said chain in one of its positions to hold said platform against tilting movement, and a latch for holding said lifting bar on said support therefor.

10. The combination with a tilting platform, of a main shaft and operating connections therefor, a depending horizontally swinging frame carried by said shaft, a pair of alined chain wheels, the one secured for rotation with the main shaft and the other journaled on said frame, a chain arranged to run over said wheels, a lifting bar, a guide bracket on the tilting platform in which said bar is mounted for endwise sliding movement, a link connecting one end of said bar to the tilting platform, the other end of said bar being secured to said chain, and a support onto which the tilting bar is moved by said chain in one of its positions to hold said platform against tilting movement.

11. The combination with a tilting platform, of a main shaft and operating connections therefor, a depending and horizontally swinging frame carried by said shaft, a pair of alined chain wheels, the one secured for rotation with the main shaft and the other journaled on said frame, a chain arranged to run over said wheels, a lifting bar secured to said chain and mounted on the tilting platform for endwise movement, a support onto which the lifting bar is moved by said chain in one of its positions to hold said platform against tilting movement, a pair of cam lugs on said bar, and a latch lever arranged to extend between said cam lugs, when said bar is resting on the support therefor, and thereby hold the bar against movement from said support.

12. The combination with a tilting platform, of a main shaft and operating connections therefor, a depending and horizontally swinging frame carried by said shaft, a pair of alined chain wheels, the one secured for rotation with the main shaft and the other journaled on said frame, a chain arranged to run over said wheels, a lifting bar secured to said chain and mounted on the tilting platform for endwise movement, a support onto which the lifting bar is moved by said chain in one of its positions to hold said platform against tilting movement, and a stop limiting the tilting movement of the platform.

In testimony whereof I affix my signature in presence of two witnesses.

FRED W. COOLEY.

Witnesses:
F. D. MERCHANT,
HARRY D. KILGORE.

Copies of this patent may be obtained for five cents each, by addressing the "Commissioner of Patents, Washington, D. C."